Patented Jan. 25, 1927.

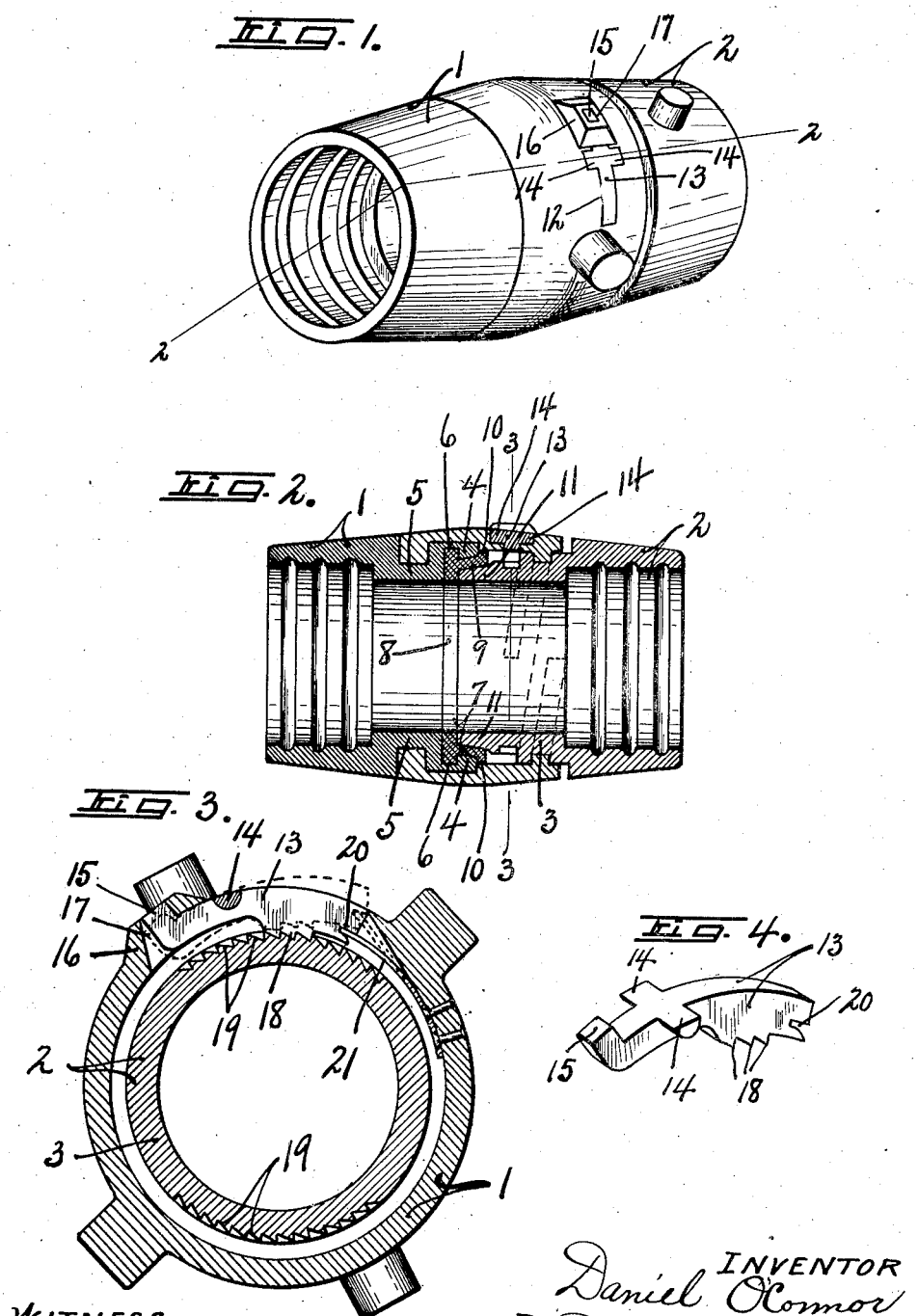

1,615,595

UNITED STATES PATENT OFFICE.

DANIEL O'CONNOR, OF JESSUP, PENNSYLVANIA.

HOSE COUPLING.

Application filed February 12, 1925. Serial No. 8,718.

This invention relates to certain new and useful improvements in hose coupling.

The main object of the invention is the production of an improved hose coupling capable of being readily and quickly coupled and uncoupled, and embodying an improved means for locking the coupler in coupled position until manually released in an easy and ready manner.

Other objects relate to the simplicity of the construction, by means of which the above advantages are attained and the tight joint produced.

Other objects and advantages relate to the details of the structure, all as will more fully appear from the following description, taken in connection with the accompanying drawings, in which:—

Figure 1 is a perspective view of a hose coupling of my invention.

Figure 2 is a longitudinal section on line 2—2, Figure 1.

Figure 3 is a lateral section on line 3—3, Figure 2.

Figure 4 is a perspective view of the rocking ratchet.

The structure as here illustrated consists primarily of two coaxial sections —1— and —2— respectively, of any suitable external form, section —2— preferably having a reduced end part —3— externally threaded and adapted to be screwed into the internally threaded end portion of a coupling ring —40—. The coupling ring is rotatably mounted on and secured to the section —1— as by having an inwardly projecting end flange —41— sealed in a circumferential groove —42— in the outer surface of section —1—.

In order to produce a joint that is assuredly liquid tight, the section —1— is formed with an inwardly extending circumferential flange —4— having its inner surface inclined somewhat toward the inner end of the section —1—, as illustrated.

This flange in connection with the portion —5— of the section —1— which is of reduced diameter, forms a circumferential groove —6— in which the flat lateral portion —8— of a gasket —7— is positioned. This gasket has a laterally-extending portion —9— constituting a substantially flat ring with a radial flange —10— at its end so formed that the laterally extending ring portion extends along the inner surface of the flange —4— and the radial flange —10— lies against the side of the flange —4—. The reduced diameter portion —3— of section —2— is formed at its end with a tapered portion —11— extending substantially parallel with the inner face of the flange —4— so that when the coupling ring —40— rotatably carried by section —1— is threaded lightly as by a suitable wrench on the section —2—, the end of the part —11— contacts with and compresses the radial portion —8— of the gasket and the inclined outer surface of the part —11— bears against the inner surface of the laterally extending ring —9— and compresses it against the inner surface of flange —4— and the flange —10— of the gasket is compressed against the adjacent wall of the flange —4—, whereby when the sections —1— and —2— are coupled together to the desired point by rotation of the coupling ring —40—, a liquid-tight joint is assured.

For the purpose of locking the sections —1— and —2— in this liquid-tight position until manually released, the coupling ring —40— is formed with a circumferential slot —12— of a length and width adapted to receive the pawl or dog —13— formed with laterally extending journals —14— seated in recesses in the outer surface of the section —1— upon opposite sides of the slot —12— so that the pawl may rock about the journals —14—. The rear end of the pawl is formed with a projection —15— extending radially and outwardly of the coupling ring —40— and projecting into a hollow boss —16— formed on and projecting outwardly from the surface of the ring —40—, the flange —15— being positioned in the radial opening —17— through the boss and normally having its outer end lying flush with the outer surface of the boss. The inner side of the dog —13— at its front portion is formed with one or more teeth —18— adapted to engage cooperating teeth —19— upon the outer surface of the reduced portion —13— of section —2—, as perhaps best illustrated in Figure 3. These teeth preferably as shown, have straight surfaces that are radial of the sections —1— and —2— so as to lock the sections —1— and —2— against relative rotation in one direction, the other walls of the teeth being obliquely inclined, and permitting relative rotation of the section —2— and the coupling ring —40— in the opposite direction by reason of the fact that the oblique surfaces act to rock the pawl about its journals so as to release the rocking engagement of the ratchet and pawl mechanism. The ratchet teeth on the section —2— as here shown, do not extend entirely around the section, but extend throughout arcs preferably diametrically disposed or arranged in such relation that one of the ratchet mechanisms can always be brought into engagement with the pawl —13— to lock the structure.

For the purpose of maintaining the ratchet and pawl mechanism in engagement under normal conditions, the pawl —13— is formed at its forward end with a longitudinal recess or jaw —20— within which one end of a spring —21— is positioned, the opposite end of the spring preferably lying in contact with and secured to the inner surface of the coupling ring —40— by rivets or otherwise, as illustrated, and the section —1— is formed with a tapered recess —22— leading to the slot —12— and into which the end portion of the spring —21— may move when the toothed portion of dog —13— is rocked outwardly by pressure applied to the flange —15— in the boss —16—.

Spring —21— normally holds the pawl in engagement with the ratchet-teeth —19— to lock the coupling ring to section —2—.

It will be obvious that it is only necessary to thread the parts together in order to effect a ready and quick coupling of the two sections —1— and —2— through the medium of the coupling ring —40—, and that they will be locked in this position until manually released.

In order to effect release of the locking means, it is only necessary to press inwardly on the flange —15— and then separate the parts by relative rotary movement.

Altho I have shown and described a specific construction as illustrative of a perhaps preferred embodiment of my invention, I do not desire to restrict myself to the details of the structure as various changes may be made within the scope of the appended claims.

I claim:

1. A hose coupling comprising two sections and a coupling ring rotatably mounted upon one section, and having a threaded engagement with the other, one of said sections formed with ratchet teeth and the coupling ring formed with a slot, a pawl arranged in said slot for rocking movement, and having a tooth upon one side of its rocking axis and a flange extending through the wall of the coupling ring, a flange on the other side of its axis extending through the wall of the coupling ring, said pawl formed with a jaw at its forward end, a spring member having one end positioned in said jaw and its opposite end secured to the coupling ring.

2. A hose coupling comprising two sections and a coupling ring rotatably mounted upon one section and having a threaded engagement with the other, one of said sections formed with ratchet teeth and the coupling ring formed with a slot, a pawl arranged in said slot for rocking movement, and having a tooth upon one side of its rocking axis and a flange extending through the wall of the coupling ring, a flange on the other side of its axis extending through the wall of the coupling ring, said pawl formed with a jaw at its forward end, a spring member having one end positioned in said jaw and its opposite end secured to the coupling ring, and a tapering recess in the coupling ring leading to said slot and into which the spring may move as the pawl is rocked about its axis.

In witness whereof I have hereunto set my hand this 6th day of February, 1925.

DANIEL O'CONNOR.